United States Patent Office 3,018,302
Patented Jan. 23, 1962

---

3,018,302
NOVEL CYCLIC PHOSPHORIC ACID ESTER AMIDES, AND THE PRODUCTION THEREOF
Herbert Arnold, Bielefeld, Norbert Brock, Wadersloh, and Friedrich Bourseaux, Bielefeld, Germany, assignors to Asta-Werke Aktiengesellschaft Chemische Fabrik, Brackwede, Germany
No Drawing. Filed Apr. 15, 1958, Ser. No. 728,568
Claims priority, application Germany Feb. 10, 1956
9 Claims. (Cl. 260—461)

This invention relates to novel cyclic phosphoric acid ester amides, and the production thereof.

This application is a continuation-in-part of our copending patent application Serial No. 638,235, filed February 5, 1957, entitled "Novel cyclic phosphoric acid ester amides and the production thereof."

For a number of years, compounds of the type of the so-called nitrogen mustard gas which conform to the following formula

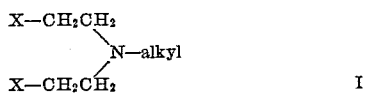

in which X is a halogen atom, preferably a chlorine atom, have found considerable medical interest for the treatment of malignant growths and similar diseases owing to their inhibiting action on the splitting up of cells. In this connection, chemical and pharmacological works have been published concerning the synthesis and effective mechanism of different derivatives of nitrogen mustard gas, which have as a common feature the direct linking of the nitrogen atom to other groups.

In the fields of phosphoric acid derivatives, derivatives of phosphoric acid triamide which contain a nitrogen mustard gas group, such as the N,N-bis-(2-chloroethyl)phosphoric acid triamide of the formula

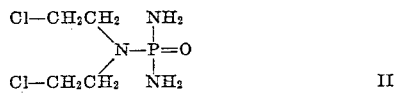

are described in J. Am. Chem. Soc., volume 76, page 655, et seq.

Furthermore, various ethylene imine derivatives of phosphoric acid, such as N,N-bis-ethylene phosphoric acid diamide and N,N-triethylene phosphoric acid triamide are described in Cancer Research, volume 12, 1952, page 310, and further derivatives of the phosphoric acid tri-amide series are described in United States patent specification No. 2,606,900.

The present invention relates to the novel cyclic phosphoric acid ester amides of the following general formula

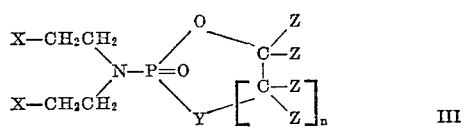

wherein Y represents a member of the group consisting of the bivalent radicals —O—, —NH— and —NZ—, each Z is a member of the group consisting of the hydrogen atom, the alkyl radicals having a chain of 1–6 carbon atoms and the derivatives of such alkyl radicals being substituted by substituents of the group consisting of the hydroxy, methoxy, ethoxy, carboxy, carboxymethyl, carboxyethyl, dimethylamino- and di-ethylamino-groups, and $n$ is a whole number from 1–5, preferably 1–3.

The substituents Z in the general Formula III are intended to comprise alkyl radicals with straight and branched chains.

The compounds of the general Formula III which are preferred according to the invention correspond to the following general formula

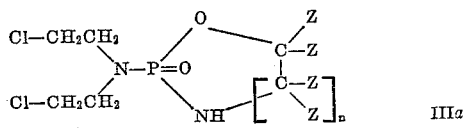

wherein Z and $n$ have the same meaning in Formula III.

Preferably at least two Z's stand for hydrogen, whereas the remaining Z's have the same meaning as in Formula III.

The products of the general Formulae III and IIIa have a particularly favourable therapeutic effect as cytostatics that is to say as agents inhibiting cell growth in the treatment of malignant growths and similar diseases. The products were applied in therapeutic tests using the Yoshida ascitic tumour, the Jensen's sarcoma and the Walker carcinoma. With the Yoshida ascitic tumor the lethal and the curative doses ($DL_{50}$ and $DC_{50}$ values) shown in the following table were ascertained. The criterion of the curative doses (DC) effect was a cure in 90 days. The curative doses were applied in four partial doses, whereas the lethal doses were applied in one single dose. The following table shows in the second vertical column the partial curative dose i.e. one fourth of the total curative dose and in the third vertical column the approximate total lethal dose.

TABLE 1

| Product | $DC_{50}$ partial dose, mg./kg. | $DL_{50}$ approximate total dose, mg./kg. |
|---|---|---|
| Example 1 | 30 | 350 |
| Example 11 | 40 | 400 |
| Example 12 | 2 | 100 |
| Example 13 | 40 | 400 |
| Example 14 | 15 | 25 |
| Example 19 | 10 | 115 |
| Example 20 | 5 | 200 |

The N,N - bis - ($\beta$-chloroethyl) - N',O - propylene-phosphoric acid ester diamide was applied in the clinic of the University at Marburg, Germany, to 45 persons having inoperable carcinoma. The daily dosis amounted in general to 150 mg. In some cases a daily dosis of 200 mg. or more was applied without side effects. The total dosis applied to the sick persons amounted in general to 5 g. In some cases up to 10 g. were given without side effects. With 28 persons the observations have been now so long as to make possible definite statements regarding the results. The following Table 2 shows the results obtained with the said 28 persons. Attention is called once more to the fact that all persons who were treated with the product mentioned before were afflicted with inoperable carcinoma i.e. were deadly sick before the treatment began.

TABLE 2

| Carcinoma (number of persons) | Very good success | Partial success | No success |
|---|---|---|---|
| Metastasized carcinoma (9) | 1 | 3 | 5 |
| Lymphosarcoma (5) | 4 | 1 | |
| Retothelial sarcoma (1) | | | 1 |
| Melanosarcoma (1) | | | 1 |
| Plasmocytoma (1) | 1 | | |
| Lymphogranulomatosis (4) | | 4 | |
| Chronic myelosis (7) | | 7 | |

The novel products can be obtained by reacting a compound of the general formula

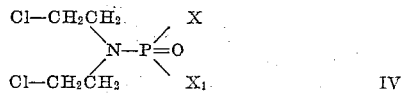

in which X and $X_1$ is either a halogen atom, preferably a chlorine atom, or the group —OR (R is an alkyl, aralkyl or aryl radical), with a compound of the general formula

wherein Z and $n$ have the same meaning as in Formula III and $a$ is a member of the group consisting of the monovalent radicals —OH, —$NH_2$ and —NH—Z, in an inert solvent, for example dioxane or benzene, in the presence of an acidbinding agent, for example triethylamine, at a temperature between about 10° C. and the boiling point of the inert solvent used. The novel products are also obtainable by allowing a compound of the general formula

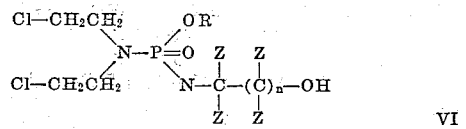

wherein Z, R and $n$ have the significance indicated above, to react with itself in an inert solvent, for example dioxane or benzene, preferably at about the boiling point of the inert solvent.

In detail, the novel compounds can be produced as follows: The known N,N-bis-($\beta$-halogenoethyl)-phosphamide dihalides (Friedman and Seligman: J. Am. Chem. Soc. 76, pages 655–61 (1954); Brintzinger and collaborators: Chem. Ber. 82, page 393 (1949) can be reacted in the presence of acid-binding agents, for example tri-ethylamine, with alkanolamines or glycols. The reaction in this case proceeds in accordance with the following equation:

(1) With alkanolamines:

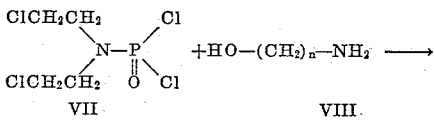

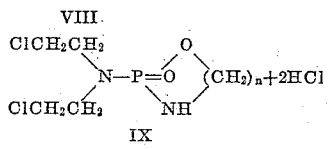

(2) With glycols:

Compound VII+HO—$(CH_2)_n$—OH ⟶

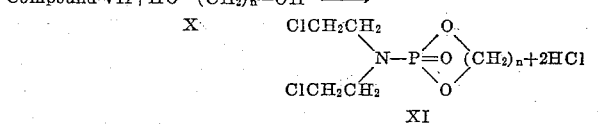

Dioxane or other inert solvents are preferably used as reaction medium. The above ring closure reactions were not to be expected, since heterocyclic compounds, in which a phosphorus atom is not only a ring member but is also linked in the manner of an amide to the radical of bis-($\beta$-cholorethyl)-amine, have so far not been described. Furthermore, it was to be expected that the said reactions would not proceed homogeneously in view of the high reactivity of N,N-bis-($\beta$-chloroethyl)-phosphamide dichloride and would in certain cases lead to mixtures of various products. With the process of the invention the strong tendency to ring formation is particularly surprising.

Instead of starting with N,N-($\beta$-halogenoethyl)-phosphamide dihalides, it is also possible to use compounds of the following general formula

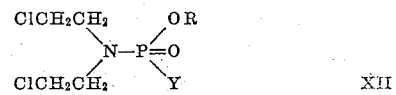

in which Y is a halogen atom or the group OR and R is an aryl, aralkyl or alkyl radical, and to react these initial products with alkanolamines or glycols. This reaction generally takes place in two stages: first of all the group Y reacts unilaterally with the alkanolamine or glycol and then the ring closure takes place by the method of intra-molecular re-esterification. When an alkanolamine is used, it is for example possible for the compound of the formula

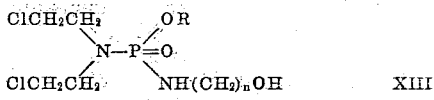

to be formed as an intermediate, and for this compound then to rearrange itself to form the cyclic compound.

The tendency to ring formation is also so great in this case that the intermediates of Formula XIII are very unstable and change into the ring-like products when simply allowed to stand, for example with splitting off of phenol. The last-mentioned reaction is by its nature a re-esterification taking place intra-molecularly and as such is novel.

The ring formation is so strong that, instead of alkanolamines or glycols being used in the aforementioned reactions, it is also possible to use functional derivatives of such compounds, such as N-acyl derivatives. The reaction of these compounds can take place in one or two stages, depending on the bending strength of the acyl groups, these acyl groups initially split off under the reaction conditions, either simultaneously or successively, and the liberated alkanolamine then being cyclised with N,N-bis-($\beta$-chloroethyl)-phosphamide dichloride. These reactions can however also proceed as follows: the unilaterally acylated alkanolamine derivatives first of all react with their free group ($NH_2$ or OH) mono-functionally with N,N - bis - ($\beta$-chloroethyl)-phosphamide dichloride, and then the cyclisation to phosphamide takes place in a second stage by elimination of the protecting acyl group prior to or during the secondary reaction, whereby the resultant free group is made available for cyclising.

The formation of the cyclic phosphoric acid ester amides with incorporation of amino acids or the amino alcohols corresponding to the latter is of particular interest. This reaction proceeds for example in accordance with the following reaction scheme:

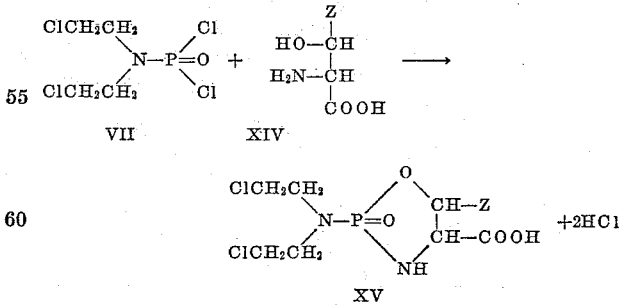

The cyclic phosphoric acid ester amides of the present invention also include compounds in which the radicals of carbohydrates, sugars or other polyhydroxy compounds are incorporated into the molecule as a side chain. These products have the following general formula:

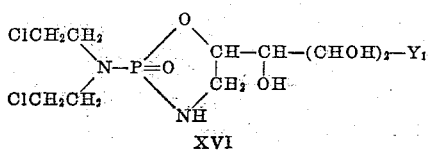

wherein $Y_1$ is either a hydroxymethyl group or an aldehyde group, and the hydrogen atom of the imino group contained in the ring can be replaced by an oxygen atom.

Furthermore, with polyhydroxy derivatives, it is also possible for two or three phosphamide rings to be present, as in the following formula

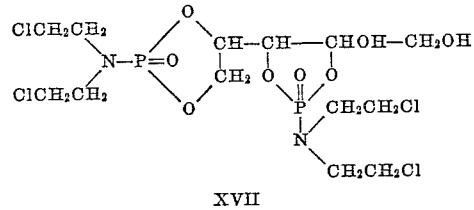

XVII

Compounds of the two last-mentioned types are readily obtainable if suitable proportions of the reactants are chosen in the reaction with polyhydroxy compounds.

The following examples further illustrate the invention.

EXAMPLE 1

N,N-bis-(β-chloroethyl)-N'-O-ethylene phosphoric acid ester diamide

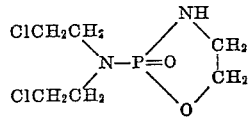

A solution of 6.1 g. (1/10 mol) of ethanolamine and 20.2 g. (2/10 mol) of tri-ethylamine in 60 cc. of absolute dioxane is added dropwise at 25° C. and while stirring, over a period of 75 minutes, to 25.9 g. (1/10 mol) of N,N-bis-(β-chloroethyl)-phosphoric acid amide dichloride dissolved in 70 cc. of absolute dioxane. The mixture is then stirred for 2 hours and filtered with suction, and the filter residue is washed with 60 cc. of absolute dioxane and the solvent is completely evaporated in vacuo at a water bath temperature of 40–45° C. The residue, which solidifies after initial inoculation, is purified by dissolving in and recrystallising from ethanol or ethyl acetate. M.P. 99.4° C. Yield: 70–75% of the theoretical.

It is also possible to substitute a solution of 18.3 g. (3/10 mol) of ethanolamine in 60 cc. of absolute dioxane for the solution of ethanolamine and tri-ethylamine used in this example.

EXAMPLE 2

N,N-bis-(β-chloroethyl)-O,O'-ethylene phosphoric acid ester amide

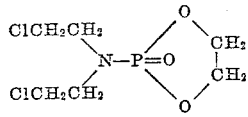

A solution of 6.2 g. (1/10 mol) of ethylene glycol and 20.2 g. (2/10 mol) of tri-ethylamine, dissolved in 100 cc. of absolute dioxane is added to a solution of 25.9 g. (1/10 mol) of N,N-bis-(β-chloroethyl)-phosphoric acid amide dichloride in 100 cc. of absolute dioxane in such a way that the temperature remains between 25 and 28° C. without external cooling. After completion of the dropwise addition, the mixture is stirred for approximately another 3 hours. The separated tri-ethylamine hydrochloride is filtered off with suction, and the filtrate is evaporated in a water-jet vacuum at 45° C. and thereafter evacuated for 1 hour in an oil pump vacuum. The residual tri-ethylamine hydrochloride is separated out by dissolving in ethyl acetate and the solution is concentrated again by evaporation. The result is a yellowish, water-soluble oil which solidifies after standing for some time. Yield: 70–75% of the theoretical. M.P.=57–58° C.

EXAMPLE 3

N,N-bis-(β-chloroethyl)-N',O-ethylene-phosphoric acid ester diamide

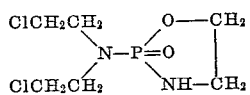

A solution of 24.4 g. of 1,2-ethanolamine in 100 cc. of dioxane is added dropwise to a boiling solution of 63.4 g. of N,N-bis-(β-chloroethyl)-O-phenyl phosphoric acid amide chloride (B.P._{0.2}: 167–169° C., Friedman, J. Am. Chem. Soc. 76, page 657) in 200 cc. of absolute dioxane. After some time, the substance is separated from the precipitated ethanolamine hydrochloride and the filtrate is concentrated in vacuo at 45° C. The oily residue is taken up with absolute benzene, filtered through carbon and mixed with ether until the mixture starts to become cloudy. When the ethereal solution is cooled with ice, the product of the structure indicated in Example 1 separates out in the form of crystals. Yield: 60–65% of the theoretical.

EXAMPLE 4

N,N-bis-(β-chloroethyl)-N',O-isopropylene phosphoric acid ester diamide

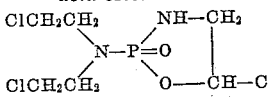

A solution of 15.0 g. of isopropanolamine-(1,2) and 40.4 g. of tri-ethylamine in 125 cc. of dioxane is added dropwise at 25° C. to a solution of 51.8 g. of N,N-bis-(β-chloroethyl)-phosphoric acid amide dichloride in 100 cc. of dioxane. After stirring for several hours, the substance is separated from the precipitated tri-ethylamine hydrochloride and the filtrate concentrated by evaporation in vacuo. The residue is taken up with a small amount of absolute ethanol and mixed with a large quantity of absolute ether. After standing overnight, the product is filtered through carbon and again concentrated in vacuo. The resulting oil, which is slightly yellowish-green in colour, crystallises after standing for a relatively long time. It can be dissolved in and recrystallised from absolute ether. M.P. 81° C. Yield: 50–55% of the theoretical.

EXAMPLE 5

N,N-bis-(β-chloroethyl)-N',O-ethylene-N'-methyl-phosphoric acid ester diamide

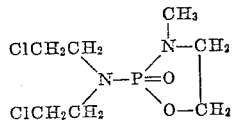

A solution of 7.5 g. of β-hydroxyethyl methylamine and 20.2 g. of tri-ethylamine in 70 cc. of absolute dioxane is added dropwise at 25–27° C. to a solution of 25.9 g. (1/10 mol) of N,N-bis-(β-chloroethyl)-phosphoric acid amide dichloride in 70 cc. of absolute dioxane. After stirring for several hours the product is separated from the precipitated tri-ethylamine hydrochloride and the filtrate is concentrated by evaporation in vacuo. The residue is taken up with a small quantity of absolute ethanol and mixed with a large quantity of absolute ether. After standing overnight in a refrigerator, it is filtered through carbon and again concentrated by evaporation in vacuo. Thereafter it is evacuated for 1 hour in an oil pump vacuum at 60° C. It yields a slightly coloured water-soluble oil. Yield: 65% of the theoretical.

EXAMPLE 6

N,N-bis-(β-chloroethyl)-O,O'-isopropylene phosphoric acid ester amide

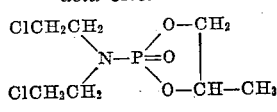

A solution of 15.2 g. of 1,2-propylene glycol and 40.4 g. of tri-ethylamine in 100 cc. of absolute dioxane is added dropwise at 25–30° C. to a solution of 51.8 g. of N,N-bis-(β-chloroethyl)-phosphoric acid amide dichloride in 150 cc. of absolute dioxane. After stirring for several hours, the product is separated from the precipitated tri-ethylamine hydrochloride and the filtrate is concentrated by evaporation in vacuo. The residue is taken up with a small amount of absolute ethanol and mixed with absolute ether until clouding occurs. After standing overnight in a refrigerator, the filtrate is filtered through carbon and again concentrated by evaporated in vacuo. It is then evacuated for 1 hour in an oil pump vacuum at 50° C. and yields a reddish oil. Yield: 60% of the theoretical.

EXAMPLE 7

N,N-bis-(β-chloroethyl)-O,N'-ethylene-N'-methyl phosphoric acid ester diamide

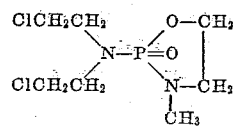

A solution of 10.1 g. of tri-ethylamine in 100 cc. of dioxane is added dropwise to a boiling solution of 31.7 g. of N,N-bis-(β-chloroethyl)-phosphoric acid amide phenyl ester chloride and 7.5 g. of β-hydroxyethyl-methylamine in 250 cc. of dioxane. The mixture is heated for 2 hours to boiling point. After cooling, the product is separated from the precipitated tri-ethylamine hydrochloride and the filtrate is concentrated by evaporation in vacuo. The residue is taken up with absolute ether and filtered through carbon. The colourless oil obtained after evaporating the ether is liberated in oil pump vacuum from the solvent and phenol which still adheres to it. The substance itself cannot be distilled. Yield: 50–55% of the theoretical.

The corresponding N,N-bis(β-chloroethyl)-O,N'-ethylene-N'-alkyl phosphoric acid ester diamides having alkyl radicals with 2 to 6 carbon atoms are obtained by following the procedure described hereinabove and using, in place of β-hydroxy ethyl methylamine, equimolecular amounts of other β-hydroxy ethyl alkylamines.

EXAMPLE 8

N,N-bis-(β-chloroethyl)O,O'(β-oxypropylene)-phosphoric acid ester amide

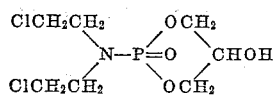

Solution of 11 g. of absolute glycerine and 20.2 g. of tri-ethylamine in 25 cc. of absolute pyridine is added dropwise at 27–30° C. to a solution of 25.9 g. of N,N-bis-(β-chloroethyl)-phosphoric acid amide dichloride in 70 cc. of absolute dioxane. The mixture is stirred for 1 day, after which the product is separated from the precipitated tri-ethylamine hydrochloride and the filtrate is concentrated by evaporation in vacuo. The residue is taken up in a small amount of absolute ethanol and mixed with absolute ether until clouding begins. After standing for 24 hours in a refrigerator, it is filtered through carbon and concentrated by evaporation in vacuo. It is thereafter evacuated for 1 hour at B.P.$_{0.2}$: 140° C. and yields a viscous, reddish-brown and water-soluble oil. Yield: 55–60% of the theoretical.

EXAMPLE 9

N,N-bis-(β-chloroethyl)-O,O'-sorbitol-phosphoric acid ester monoamide

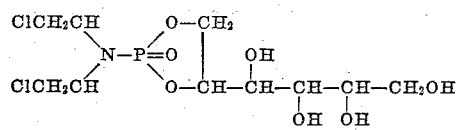

A solution of 18.2 g. of D-sorbitol and 20.2 g. of tri-ethylamine in 150 cc. of absolute pyridine is mixed dropwise at 25–30° C. with a solution of 25.9 g. of N,N-bis-(β-chloroethyl)-phosphoric acid amide dichloride in 100 cc. of absolute benzene. After standing for 2 days, the product is separated from the tri-ethylamine hydrochloride and the filtrate is concentrated by evaporation in vacuo. The residue is shaken several times with absolute ether and then dissolved in acetone. When the resulting mixture is mixed with petroleum ether, the oil again separates out, whereupon it is evacuated for 1 hour at B.P.$_{0.2}$: 60° C. The product is a viscous, reddish and fairly water-soluble oil. Yield: 50–60% of the theoretical.

EXAMPLE 10

N,N-bis-(β-chloroethyl)-O,O'-[β-bis-(oxymethyl)-propylene]-phosphoric acid ester amide

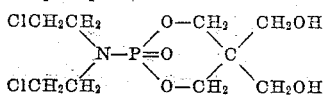

A solution of 25.9 g. of N,N-bis(β-chloroethyl)-phosphoric acid amide dichloride, dissolved in 200 cc. of absolute benzene, is added dropwise to a solution of 13.8 g. of pentaerythritol and 20.2 g. of tri-ethylamine dissolved in 250 cc. of absolute pyridine at 24–30° C. and the mixture is stirred for 1 day. After the tri-ethylamine hydrochloride which has precipitated has been separated out, the product is concentrated by evaporation in vacuo at a moderate temperature. The residue is dissolved in a small amount of absolute ethanol and mixed with such an amount of absolute ether that clouding is just apparent. After standing for 12 hours in a refrigerator, the resulting material is filtered through carbon and again concentrated by evaporation in vacuo. It is then evacuated for one hour at B.P.$_{0.2\ mm}$: 80–90° C. The result is an orange, water-soluble oil, which solidifies in the cold and cannot be distilled. Yield: 65% of the theoretical.

EXAMPLE 11

N,N-bis-(β-chloroethyl)-(O,N'-dl-serinemethyl ester)-phosphoric acid ester amide

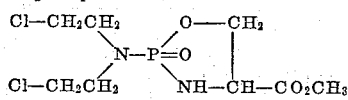

A suspension of 7.5 g. of dl-serinemethyl ester hydrochloride in 30 g. of tri-ethylamine and 100 cc. of absolute dioxane was vigorously stirred at room temperature for several days with a solution of 18.5 g. of N,N-bis-(β-chloroethyl)-phosphoric acid dichloride in 100 cc. of absolute dioxane. After separation of the precipitated tri-ethylamine hydrochloride, the solution is concentrated by evaporation in a water-jet vacuum at a moderate temperature. The result is a brownish oil, which was purified by repeated washing with ether and dried by evacuating for 1 hour under high vacuum. The product is a very viscous, brownish-coloured water soluble oil. Yield 50% of the theoretical.

EXAMPLE 12

N,N-bis-(β-chloroethyl)-N',O-propylene phosphoric acid ester diamide

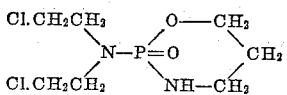

A solution of 7.5 g. (¹/₁₀ mol) of 1,3-propanolamine and 20.2 g. of tri-ethylamine in 100 cc. of absolute dioxane is added dropwise at 25–30° C. while stirring well to a solution of 25.9 g. of (¹/₁₀ mol) of N,N-bis-(β-chloroethyl)-phosphoric acid amide dichloride in 100 cc. of absolute dioxane. After the reaction is complete, the product is separated from the precipitated tri-ethylamine hydrochloride and the filtrate is concentrated by evaporation in water-jet vacuum at 35° C. The residue is dissolved in a large amount of ether and mixed to saturation with water. The N,N-bis-(β-chloroethyl)-N,O-propylene phosphoric acid diamide crystallises out of the ethereal solution, after it has stood for some time in a refrigerator, in the form of colourless water-soluble crystals. M.P. 48–49°. Yield: 65–70% of the theoretical.

EXAMPLE 13

*N,N-bis-(β-chloroethyl)-N',O-butylene phosphoric acid ester diamide*

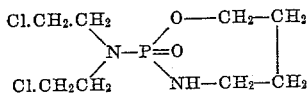

A solution of 17.8 g. of 1.4-butanolamine and 40.4 g. of triethylamine in 100 cc. of absolute dioxane is added dropwise to a solution of 51.8 g. of N,N-bis-(β-chloroethyl)-phosphoric acid amide dichloride in 100 cc. of absolute dioxane while stirring well. After the precipitated triethylamine hydrochloride has been separated out, the filtrate is concentrated by evaporation in water-jet vacuum at 25° C. The residue is dissolved in a large amount of absolute ether and left to stand for 12 hours in a refrigerator. The product is then filtered through carbon and again concentrated by evaporation in a water-jet vacuum. The result is a slightly coloured oil, which solidifies after standing for a relatively long time in a refrigerator. Yield: 30–40% of the theoretical. M.P.: 76–77° C.

EXAMPLE 14

*N,N-bis-(β-chloroethyl)-N',O-ethylene-N'-β-oxyethyl-phosphoric acid ester diamide*

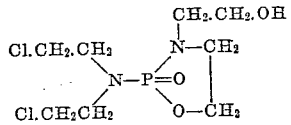

A solution of 10.5 g. (1/10 mol) of diethanolamine and 20.2 g. of triethylamine in 200 cc. of absolute dioxane is added dropwise while stirring well and at a temperature of 25–27° C. to a solution of 25.9 g. (1/10 mol) of N,N-bis-(β-chloroethyl)-phosphoric acid amide dichloride in 100 cc. of absolute dioxane. After stirring for several hours, the product is separated from the precipitated triethylamine hydrochloride and the filtrate is concentrated by evaporation in a water-jet vacuum at 35° C. The residue is dissolved in a small amount of absolute ethanol and the resulting solution is mixed with 700 cc. of absolute ether. After standing overnight in the refrigerator the mixture is filtered through carbon and again concentrated by evaporation in a water-jet vacuum. It is thereafter evacuated for 1 hour in oil pump vacuum at 45° C. The result is a thickly liquid oil which is sparingly soluble in water and which cannot be distilled. Yield: 60% of the theoretical.

EXAMPLE 15

*N,N-bis-(β-chloroethyl)-O,O'-propylene phosphoric acid ester amide*

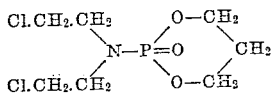

A solution of 15.2 g. of 1.3-propylene glycol and 40.4 g. of triethylamine in 100 cc. of absolute dioxane is added dropwise while stirring well at room temperature to a solution of 51.8 g. of N,N'-bis(β-chloroethyl)-phosphoric acid amide dichloride in 150 cc. of absolute dioxane. The mixture is thereafter heated for 3 hours at 45–50° C. The precipitated triethylamine hydrochloride is separated out and the filtrate is concentrated by evaporation in a water-jet vacuum at 35° C. The residue is dissolved in a small amount of absolute ethanol and mixed with approximately 1 litre of ether. After standing overnight in a refrigerator, the resulting mixture is filtered through carbon and again concentrated by evaporation in a water-jet vacuum. The product is thereafter evacuated for 1 hour in an oil pump vacuum at 50° C. The resultant oil solidifies after standing for a relatively long time in a refrigerator and can be dissolved in and recrystallized from ethyl acetate. Melting point: 49–50° C. Yield: 70% of the theoretical.

EXAMPLE 16

*N,N-bis-(β-chloroethyl)-O,O'-butylene phosphoric acid ester amide*

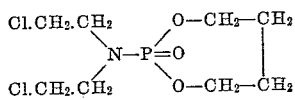

A solution of 9 g. of tetra-methylene glycol and 20.5 g. of triethylamine in 100 cc. of absolute dioxane is run at room temperature and while stirring well into a solution of 29.5 g. of N,N-bis-(β-chloroethyl)-phosphoric acid amide dichloride in 100 cc. of absolute dioxane. The mixture is thereafter heated for 3 hours at 45–50° C. The precipitated triethylamine hydrochloride is separated out and the filtrate is concentrated by evaporation in a water-jet vacuum at 35° C. The residue is dissolved in a small amount of ethanol and mixed with approximately 700 cc. of absolute ether. After standing overnight in a refrigerator, the resulting mixture is filtered through carbon and again concentrated by evaporation in a water-jet vacuum. It is thereafter evacuated for 1 hour in an oil pump vacuum at 80–90° C. The resultant oil solidifies after standing for a relatively long time in a refrigerator and can be dissolved in and recrystallized from ethyl acetate. Melting point: 72–73° C. Yield: 60% of the theoretical.

EXAMPLE 17

*N,N-bis-(β-chloroethyl)-O,O'-(ethoxymethyl)-ethylene phosphoric acid ester amide*

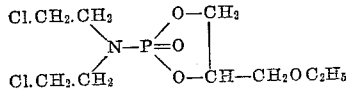

A solution of 9 g. glycerine ethyl ether and 20 g. triethylamine in 100 cc. of absolute dioxane is added drop by drop to a solution of 19.4 g. N,N-bis-(β-chloroethyl) phosphoric acid amide dichloride in 100 cc. of absolute dioxane. Then the reaction mixture is heated for about three hours to about 50° C. The almost quantitatively precipitated triethylamine hydrochloride is filtered off and washed with dioxane and ether. The filtrate is concentrated by evaporation in a water-jet vacuum at 40–50° C. The residue is dissolved in a small amount of absolute ethanol and mixed with about 700 cc. of absolute ether. After standing overnight in a refrigerator the resulting mixture is filtered through carbon and again concentrated by evaporation in a water-jet vacuum. The product is thereafter evacuated for 1½ hours in a high vacuum at 40–50° C. The resulting oil is yellow, of low viscosity and not distillable. Yield: 56% of the theoretical.

The corresponding N,N - bis - (β - chloroethyl) - O,O'-(methoxymethyl) ethylene phosphoric acid ester amide is obtained by following the procedure described hereinabove and using, in place of glycerol ethyl ether, equimolecular amounts of glycerol methyl ether.

EXAMPLE 18

*N,N-bis-(β-chloroethyl)-O,O'-(3-diethylamino)-1.2-propylene phosphoric acid ester amide*

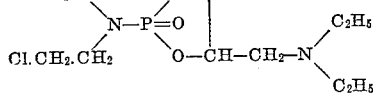

A solution of 7 g. 3-diethylamino-1.2-propylene glycol and 13 g. triethylamine in 50 cc. of absolute dioxane is added drop by drop to a solution of 16.3 g. N,N-bis-(β-chloroethyl) phosphoric acid amide dichloride in 50 cc.

of dioxane absolute. The reaction mixture thus obtained is heated for two hours to 50° C. After standing for 12 hours the almost quantitatively separated triethylamine hydrochloride is filtered off and washed with dioxane and ether. The filtrate is filtered over carbon and concentrated by evaporation in a water-jet vacuum. The residue is dissolved in about 400 cc. of ether, allowed to stand for two hours in a refrigerator, filtered over carbon and again concentrated by evaporation in a water-jet vacuum. The product is thereafter evacuated for 1–2 hours in a high vacuum at about 50° C. The resulting oil is yellowish, not distillable and water-soluble in the form of its hydrochloride. Yield: 35–40% of the theoretical.

The corresponding N,N-bis-(β-chloroethyl)-O,O'-(3-dimethylamino)-1,2-propylene phosphoric acid ester amide is obtained by following the procedure described hereinabove and using, in place of 3-diethylamino-1,2-propylene glycol, equimolecular amounts of 3-dimethylamino-1,2-propylene glycol.

EXAMPLE 19

*N,N-bis-(β-chloroethyl)-N',O-[(3-methyl)-propylene] phosphoric acid ester diamide*

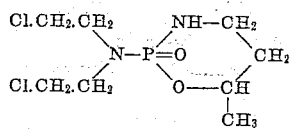

A solution of 17.8 g. 4-aminobutanole-(2) and 40.4 g. triethylamine in 100 cc. of dioxane absolute is added drop by drop to a solution of 51.8 g. N,N-bis-(β-chloroethyl) phosphoric acid amide dichloride while stirring well and cooling to a temperature of 25–29° C. The triethylamine hydrochloride separates almost quantitatively. It is filtered off and the filtrate is concentrated by evaporation in a vacuum at 35–40° C. The residue is crystalline. It is recrystallized from a small quantity of methanole absolute. The resulting white crystals have a melting point of 115–116° C. Yield: 30–35% of the theoretical.

EXAMPLE 20

*N,N-bis-(β-chloroethyl)-N',O-[(1.2-dimethyl)-propylene] phosphoric acid ester diamide*

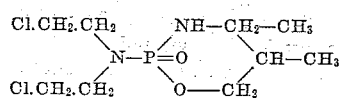

25.9 g. N,N-bis-(β-chloroethyl) phosphoric acid amide dichloride in 100 cc. of dioxane abs. are reacted with 10.3 g. (2)-methylbutanole-(1)-amine-(3) and 25 g. triethylamine in 100 cc. of absolute dioxane in the manner described in Example 17. The resulting white product is recrystallized from a small quantity of methanole absolute. It has a melting point of 138–140° C. Yield: 25–30% of the theoretical.

EXAMPLE 21

*N,N-bis-(β-chloroethyl)-N',O-[(1-ethyl)-ethylene] phosphoric acid ester diamide*

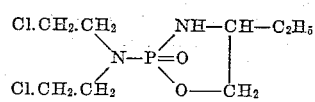

51.8 g. N,N-bis-(β-chloroethyl) phosphoric acid amide dichloride in 150 cc. of dioxane absolute are reacted according to Example 17 with 17.8 g. 2-aminobutanole-(1) and 40.4 g. triethylamine in 150 cc. of dioxane absolute. The product is worked up as described before. The resulting oil is purified with a mixture of ether and petrolether. It forms a slightly coloured oil. Yield: 60–65% of the theoretical.

EXAMPLE 22

*N,N-bis-(β-chloroethyl)-O,O'-pentamethylene phosphoric acid ester amide*

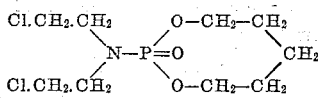

A solution of 25.9 g. N,N-bis-(β-chloroethyl) phosphoric acid amide dichloride, 10.4 g. pentamethylene glycol and 20.2 g. triethylamine in 100 cc. of dioxane absolute is heated to 40° C. until the triethylamine hydrochloride has separated quantitatively. The reaction mixture is worked up as described before. The resulting oil is yellowish, thickly liquid and solidifies slowly. Yield: 50% of the theoretical.

What we claim is:

1. Novel products of the following general formula

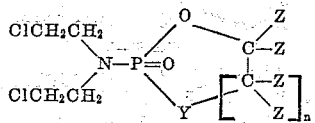

wherein Y represents a member of the group consisting of the bivalent radicals —O—, —NH— and —NZ—, each Z is a member of the group consisting of the hydrogen atom, the alkyl radicals having a chain of 1–6 carbon atoms and the derivatives of such alkyl radicals being substituted by substituents of the group consisting of the hydroxy, methoxy, ethoxy, carboxy, carboxymethyl, carboxyethyl, dimethylamino and diethylamino-groups, and $n$ is a whole number from 1–4.

2. Novel products of the following general formula

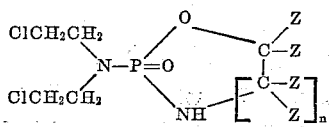

wherein each Z is a member of the group consisting of the hydrogen atom, the alkyl radicals having a chain of 1–6 carbon atoms and the derivatives of such alkyl radicals being substituted by substituents of the group consisting of the hydroxy, methoxy, ethoxy, carboxy, carboxymethyl, carboxyethyl, dimethylamino and diethylamino-groups, and $n$ is a whole number from 1–4.

3. N,N-bis-(β-chloroethyl)-N',O - ethylene phosphoric acid ester diamide.

4. N,N-bis-(β-chloroethyl)-N',O-propylene phosphoric acid ester diamide.

5. N,N-bis-(β-chloroethyl)-N',O - butylene phosphoric acid ester diamide.

6. N,N-bis-(β-chloroethyl) - N',O-[(3-methyl)-propylene] phosphoric acid ester diamide.

7. N,N-bis-(β-chloroethyl) - N',O-[(1.2-dimethyl)-propylene] phosphoric acid ester diamide.

8. A process for the production of novel cyclic compounds containing a phosphorus atom in the ring, wherein a compound of the general formula

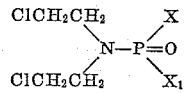

wherein X and $X_1$ are members of the group consisting of the halogen atoms, the alkoxy-, aralkoxy- and aryloxy-groups is reacted with a compound of the general formula

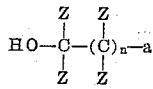

wherein each Z is a member of the group consisting of the hydrogen atom, the alkyl radicals having a chain of 1–6 carbon atoms and the derivatives of such alkyl radicals being substituted by substituents of the group consisting of the hydroxy, methoxy, ethoxy, carboxy, carboxymethyl, carboxyethyl, dimethylamino and diethylamino-groups, $n$ is a whole number from 1–4, and $a$ is a member of the hydroxy- and the amino-group and the group —NH—Z, in an inert solvent in the presence of an acid-binding agent at a temperature of about 10° C. to the boiling point of the inert solvent.

9. The N,N-bis-(β-chloroethyl) - N',O - alkylene phosphoric acid ester diamide, the alkylene radical thereof having less than 6 carbon atoms, said compound corresponding to the formula

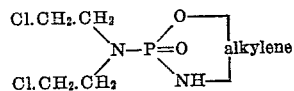

No references cited.